United States Patent
Choi et al.

(10) Patent No.: US 9,912,514 B2
(45) Date of Patent: Mar. 6, 2018

(54) METHOD AND DEVICE FOR TRANSMITTING DATA BASED ON DIFFERENT PILOT TONE PATTERNS IN WIRELESS LAN

(71) Applicant: LG ELECTRONICS INC., Seoul (KR)

(72) Inventors: Jinsoo Choi, Seoul (KR); Jinyoung Chun, Seoul (KR); Wookbong Lee, Seoul (KR); Dongguk Lim, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/524,785

(22) PCT Filed: Nov. 27, 2015

(86) PCT No.: PCT/KR2015/012827
§ 371 (c)(1),
(2) Date: May 5, 2017

(87) PCT Pub. No.: WO2016/085286
PCT Pub. Date: Jun. 2, 2016

(65) Prior Publication Data
US 2017/0373908 A1 Dec. 28, 2017

Related U.S. Application Data

(60) Provisional application No. 62/085,251, filed on Nov. 27, 2014.

(51) Int. Cl.
*H04W 4/00* (2009.01)
*H04L 27/26* (2006.01)
(Continued)

(52) U.S. Cl.
CPC ....... *H04L 27/2675* (2013.01); *H04B 7/0452* (2013.01); *H04B 7/0697* (2013.01); *H04W 84/12* (2013.01)

(58) Field of Classification Search
CPC ....... H04W 88/02; H04W 4/02; H04W 88/06; H04W 76/02; H04W 92/02; H04W 84/12;
(Continued)

(56) References Cited

U.S. PATENT DOCUMENTS 9,413,576 B2 * 8/2016 Srinivasa ............... H04L 1/0016
9,716,607 B2 * 7/2017 Zhang .................. H04L 27/2602
(Continued)

FOREIGN PATENT DOCUMENTS

KR 10-2014-0098068 A 8/2014
KR 10-2014-0114013 A 9/2014

*Primary Examiner* — Nhan Le
(74) *Attorney, Agent, or Firm* — Birch, Stewart, Kolasch & Birch, LLP

(57) ABSTRACT

Disclosed are a method and a device for transmitting data based on different pilot tone patterns in a wireless LAN. The method for transmitting data based on the different pilot tone patterns in a wireless LAN may comprise the steps of: an AP transmitting, to a first STA, a first data field generated based on a first pilot tone pattern, from a first frequency bandwidth; and the AP transmitting, to a second STA, a second data field generated based on a second pilot tone pattern, from a second frequency bandwidth, wherein the size of the first frequency bandwidth is n times larger than the size of the second frequency bandwidth, the size of IFFT applied to the first data field and the size of IFFT applied to the second data field are identical, the first pilot tone pattern includes a plurality of first pilot tones, wherein the plurality of first pilot tones are respectively allocated to each of a plurality of first pilot tone indexes, the second pilot tone pattern includes a plurality of second pilot tones, wherein the plurality of second pilot tones are respectively allocated to each of a
(Continued)

plurality of second pilot tone indexes, and wherein a portion of the first pilot tone indexes may be identical to the plurality of second pilot tone indexes.

8 Claims, 10 Drawing Sheets

(51) Int. Cl.
*H04B 7/0452* (2017.01)
*H04B 7/06* (2006.01)
*H04W 84/12* (2009.01)

(58) Field of Classification Search
CPC ......... H04W 84/18; H04W 8/04; H04W 8/26; H04L 27/2626; H04L 5/023; H04L 5/0044
USPC ......... 455/422.1, 502, 550.1, 562.1; 370/338
See application file for complete search history.

(56) References Cited

U.S. PATENT DOCUMENTS

| 9,729,371 B2 * | 8/2017 | Zhang ................. H04L 27/2626 |
| 2013/0202001 A1 | 8/2013 | Zhang |
| 2014/0050259 A1 | 2/2014 | Azizi et al. |
| 2014/0205029 A1 | 7/2014 | Srinivasa et al. |

* cited by examiner

FIG. 1
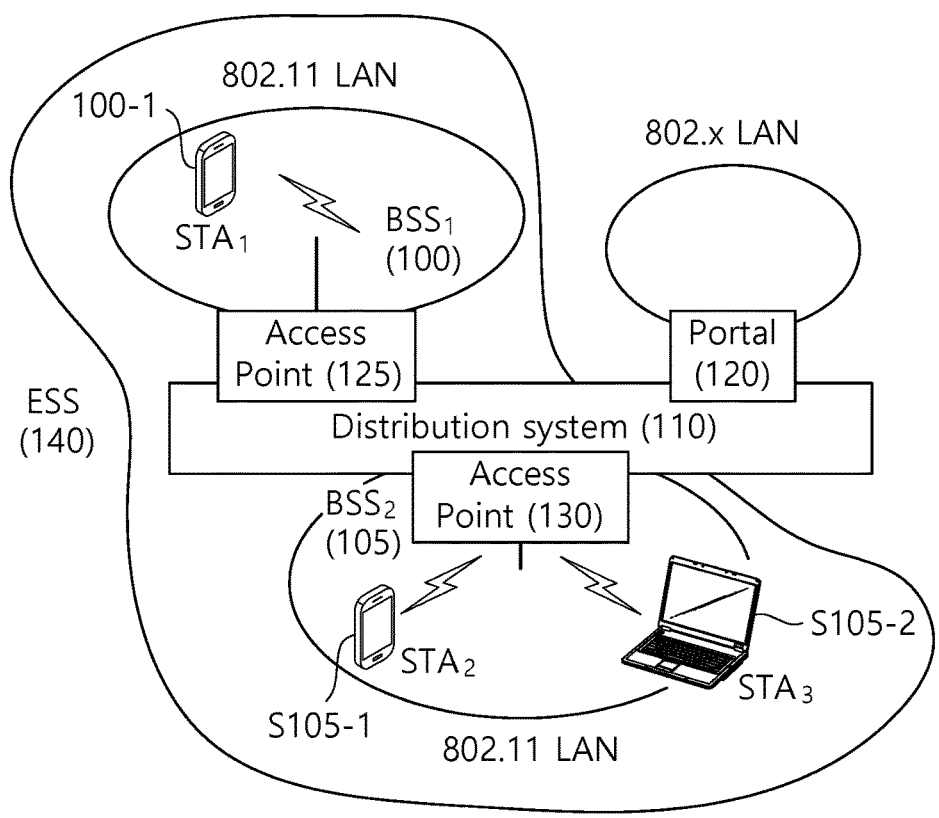
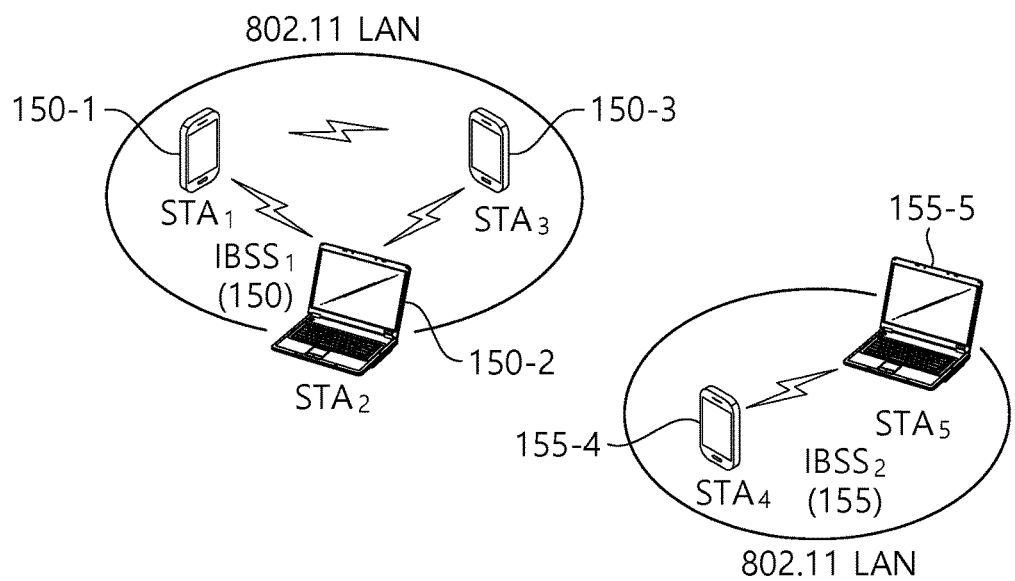

METHOD AND DEVICE FOR TRANSMITTING DATA BASED ON DIFFERENT PILOT TONE PATTERNS IN WIRELESS LAN

CROSS REFERENCE TO RELATED APPLICATIONS

This application is the National Phase of PCT International Application No. PCT/KR2015/012827, filed on Nov. 27, 2015, which claims priority under 35 U.S.C. 119(e) to U.S. Provisional Application No. 62/085,251, filed on Nov. 27, 2014, all of which are hereby expressly incorporated by reference into the present application.

BACKGROUND OF THE INVENTION

Field of the Invention

The present invention relates to wireless communication and, most particularly, to a method and device for transmitting data based on different pilot tone patterns in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of the present invention is to provide a method for transmitting data based on different pilot patterns in a wireless LAN.

Another object of the present invention is to provide a device for transmitting data based on different pilot patterns in a wireless LAN.

Technical Solutions

In order to achieve the above-described technical object of the present invention, according to an aspect of the present invention, a method for transmitting data based on different pilot tone patterns in a wireless LAN may include the steps of transmitting, by an access point (AP), a first data field being generated based on a first pilot tone pattern within a first frequency bandwidth to a first station (STA), and transmitting, by the AP, a second data field being generated based on a second pilot tone pattern within a second frequency bandwidth to a second STA, wherein a size of the first frequency bandwidth may be n times (wherein n is an integer equal to or greater than 2) larger than a size of the second frequency bandwidth, wherein an inverse fast fourier transform (IFFT) size being applied to the first data field may be equal to an IFFT size being applied to the second data field, wherein the first pilot tone pattern may include a plurality of first pilot tones, wherein each of the plurality of first pilot tones may be allocated to each of a plurality of first pilot tone indexes, wherein the second pilot tone pattern may include a plurality of second pilot tones, wherein each of the plurality of second pilot tones may be allocated to each of a plurality of second pilot tone indexes, wherein a part of the plurality of first pilot tone indexes may be identical to the plurality of second pilot tone indexes, and wherein a pilot tone index may have a positive value that increases in a direction along which the frequency increases based on a direct current (DC) tone and may be mapped to each of a plurality of tones, and a pilot tone index may have a negative value that decreases in a direction along which the frequency decreases based on the DC tone and may be mapped to each of a plurality of tones.

In order to achieve the above-described technical object of the present invention, according to another aspect of the present invention, an access point (AP) for transmitting data based on different pilot tone patterns in a wireless LAN may include a radio frequency (RF) unit transmitting and receiving radio signals, and a processor being operatively connected to the RF unit, wherein the processor may be configured to transmit a first data field being generated based on a first pilot tone pattern within a first frequency bandwidth to a first station (STA), and to transmit a second data field being generated based on a second pilot tone pattern within a second frequency bandwidth to a second STA, wherein a size of the first frequency bandwidth may be n times (wherein n is an integer equal to or greater than 2) larger than a size of the second frequency bandwidth, wherein an inverse fast fourier transform (IFFT) size being applied to the first data field may be equal to an IFFT size being applied to the second data field, wherein the first pilot tone pattern may include a plurality of first pilot tones, wherein each of the plurality of first pilot tones may be allocated to each of a plurality of first pilot tone indexes, wherein the second pilot tone pattern may include a plurality of second pilot tones, wherein each of the plurality of second pilot tones may be allocated to each of a plurality of second pilot tone indexes, wherein a part of the plurality of first pilot tone indexes may be identical to the plurality of second pilot tone indexes, and wherein a pilot tone index may have a positive value that increases in a direction along which the frequency increases based on a direct current (DC) tone and may be mapped to each of a plurality of tones, and a pilot tone index have a negative value that decreases in a direction along which the frequency decreases based on the DC tone and may be mapped to each of a plurality of tones.

Effects of the Invention

When applying an inverse fast fourier transform (IFFT)/fast fourier transform (FFT) size that is increased for the same bandwidth, overhead caused by the pilot tones and level of complexity in the processing may be reduced.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
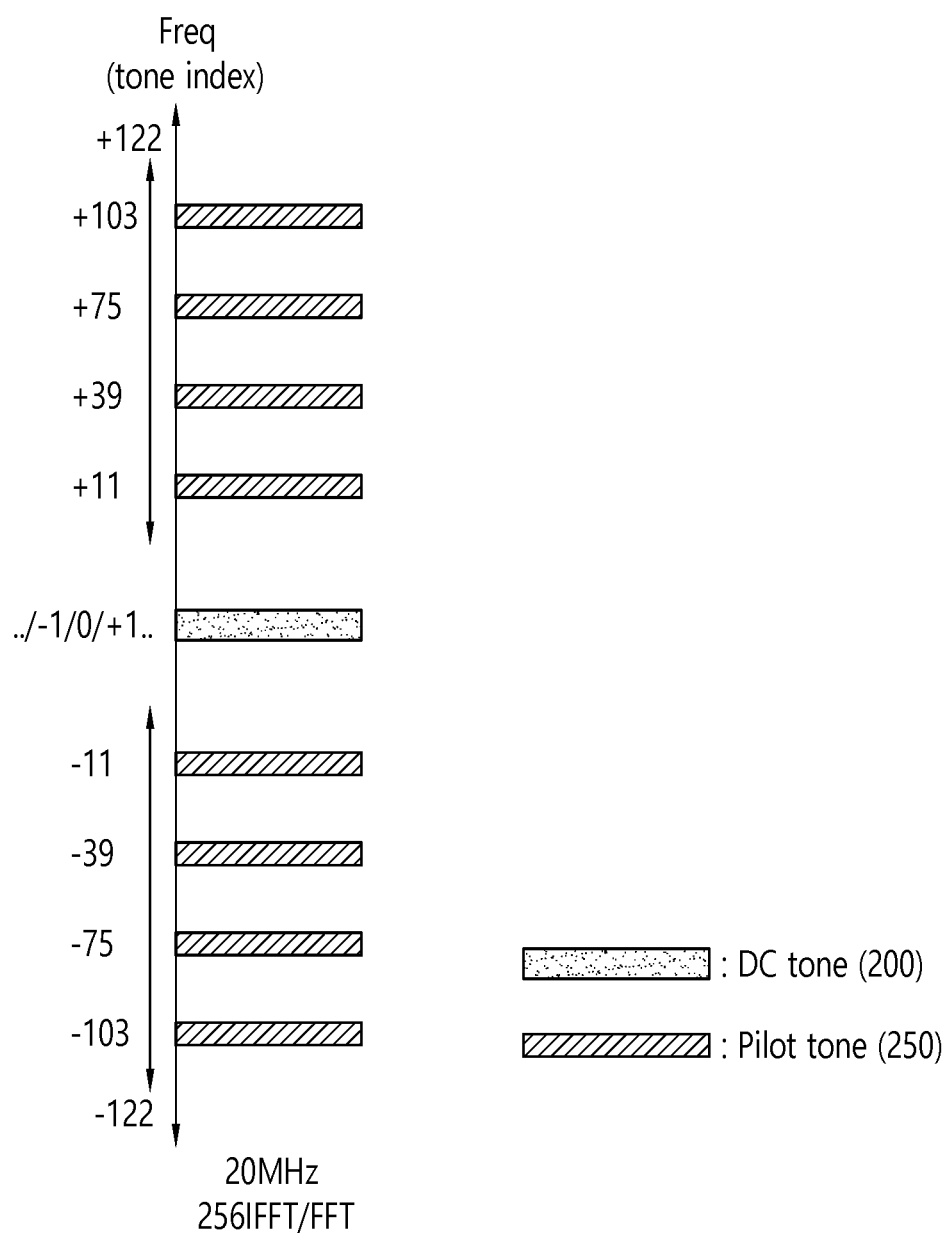
FIG. 2 is a conceptual view illustrating a pilot tone pattern according to an exemplary embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the WirelessLAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

In order to enhance the throughput of a wireless LAN system, or in order to enhance the robustness against an inter-symbol interference (ISI) in an outdoor environment, IFFT/FFT that is increased to a size that is larger than the conventional IFFT/FFT size in an available system bandwidth. For example, in case 128 IFFT/FFT (IFFT/FFT having a size that is 2 times larger) or 256 IFFT/FFT (IFFT/FFT having a size that is 4 times larger) is applied instead of 64 IFFT/FFT in the 20 MHz bandwidth, a wireless LAN system may be designed to reduce a ratio of a portion of a cyclic prefix (CP), so that a throughput gain corresponding to the reduced CP length can be obtained. Alternatively, performance degradation that is caused by ISI in an outdoor environment may be reduced based on a CP duration, which is increased by maintaining the CP ratio.

In case the subcarrier is increased due to the IFFT/FFT that is increased to a size that is larger than the conventional IFFT/FFT size, a number of pilot tones (or pilot subcarriers) that is proportional to the increased subcarrier may not be required to be allocated.

More specifically, although the IFFT/FFT is performed based on the increased size, the size of the actual bandwidth performing channel measurement and phase tracking is the same. For example, 256 IFFT/FFT was used for an 80 MHz bandwidth in the conventional (or legacy) wireless LAN system, 1024 IFFT/FFT that is 4 times larger may be used for the 80 MHz bandwidth in the wireless LAN system according to the exemplary embodiment of the present invention. Even in a case when the subcarrier is increased within the bandwidth, since the size of the actual channel bandwidth has not increased, the number of pilot tones is not required to be increased to 4 times its initial number in proportion within the increased subcarrier.

Therefore, in case an IFFT/FFT that is increased to a size that is larger than the conventional IFFT/FFT size is used, the definition of a pilot subcarrier being inserted in a PHY protocol data unit (PPDU) (or frame) is required. The PPDU may include a PHY header and a medium access control (MAC) protocol data unit (MPDU) (or aggravated (A)-MPDU), and the MPDU may include a MAC header and a MAC service data unit (MSDU). A frame may be used as a term for indicating the MPDU.

The pilot tone of a new wireless LAN system, which uses the increased IFFT/FFT in order to reduce the level of complexity caused by the adoption of the new wireless LAN system, may be allocated so that the pilot allocation method of the conventional (or legacy) wireless LAN system can be maintained as much as possible. Hereinafter, a detailed allocation method of the pilot tone will be disclosed.

FIG. 2 is a conceptual view illustrating a pilot tone pattern according to an exemplary embodiment of the present invention.

In FIG. 2, the pilot tone pattern according to the exemplary embodiment of the present invention may be determined based on a pilot tone pattern of the legacy (or conventional) wireless LAN system (hereinafter referred to as a conventional pilot tone pattern), which is configured when using IFFT/FFT having the same size as the increased IFFT/FFT.

Referring to FIG. 2, a case when an IFFT/FFT that is increased to 2 times its initial size for the 20 MHz bandwidth is used may be assumed. The conventional wireless LAN system may use 128 IFFT/FFT for the 40 MHz bandwidth, and the wireless LAN system according to the exemplary embodiment of the present invention may use the 128 IFFT/FFT for the 20 MHz bandwidth. In this case, the wireless LAN system according to the exemplary embodiment of the present invention may determine the pilot tone pattern corresponding to the 20 MHz bandwidth based on the pilot tone pattern corresponding to the 40 MHz bandwidth of the conventional wireless LAN system.

As another example, a case when an IFFT/FFT that is increased to 4 times its initial size for the 20 MHz bandwidth is used may be assumed. The conventional wireless LAN system may use 256 IFFT/FFT for the 80 MHz bandwidth, and the wireless LAN system according to the exemplary embodiment of the present invention may use the 256 IFFT/FFT for the 20 MHz bandwidth. In this case, the wireless LAN system according to the exemplary embodiment of the present invention may determine the pilot tone pattern corresponding to the 20 MHz bandwidth based on the pilot tone pattern corresponding to the 80 MHz bandwidth of the conventional wireless LAN system.

More specifically, in case the 256 IFFT/FFT is used for the 80 MHz bandwidth in the conventional wireless LAN system (institute of electrical and electronics engineers (IEEE) 802.11ac), the pilot tone 250 may be allocated to positions corresponding to subcarrier indexes (or tone indexes) of $\{\pm11, \pm39, \pm75, \pm103\}$. More specifically, the conventional plot tone pattern may correspond to $\{\pm11, \pm39, \pm75, \pm103\}$. In case of performing 256 IFFT/FFT, among the 256 subcarriers (or tones), the tones excluding the left guard tone and the right guard tone may be indexed with tone index values within the range of $-122 \sim +122$. More specifically, the DC tone 200 may be indexed as 0, $\pm1$, and so on, and subcarriers positioned between the DC tone 200 and the left guard tone (or right guard tone) may have subcarrier index values within the range of $+2 \sim +122$, and the subcarriers positioned between the DC tone 200 and the right guard tone (or left guard tone) may have subcarrier index values within the range of $-2 \sim -122$.

Among the plurality of subcarriers corresponding to the tone index values within the range of $-122 \sim +1122$, the pilot tone 250 may be allocated to positions corresponding to subcarrier indexes (or tone indexes) of $\{\pm11, \pm39, \pm75, \pm103\}$. The tone index where the pilot tone 250 is positioned may also be expressed by using the term pilot frequency index.

Therefore, in case 256 IFFT/FFT is applied for the 20 MHz bandwidth in the wireless LAN system according to the exemplary embodiment of the present invention, the pilot tone 250 may be allocated to positions corresponding to subcarrier indexes (tone indexes) of $\{\pm11, \pm39, \pm75, \pm103\}$, and the pilot tone pattern (or pilot frequency index) may correspond to $\{\pm11, \pm39, \pm75, \pm103\}$.

As another example, in case 512 IFFT/FFT is used for a 160 MHz bandwidth in the conventional wireless LAN system (IEEE 802.11ac), the pilot tone may be allocated to positions corresponding to subcarrier indexes (tone indexes) of $\{\pm25, \pm53, \pm89, \pm117, \pm139, \pm167, \pm203, \pm231\}$. Therefore, in case 512 IFFT/FFT is applied for the 40 MHz bandwidth in the wireless LAN system according to the exemplary embodiment, the pilot tone may be allocated to positions corresponding to subcarrier indexes (tone indexes) of $\{\pm25, \pm53, \pm89, \pm117, \pm139, \pm167, \pm203, \pm231\}$, and the pilot tone pattern (or pilot frequency index) may correspond to $\{\pm25, \pm53, \pm89, \pm117, \pm139, \pm167, \pm203, \pm231\}$.

In case 1024 IFFT/FFT is applied for the 80 MHz bandwidth in the wireless LAN system according to the exemplary embodiment of the present invention, the pilot tone index that is configured for the 40 MHz bandwidth may be used. More specifically, the 80 MHz bandwidth may include two sub-40 MHz bandwidths, and the pilot tone positions corresponding to each of the two sub-40 MHz bandwidths that are included in the 80 MHz bandwidth may be configured to correspond to the positions of the pilot tone pattern {±25, ±53, ±89, ±117, ±139, ±167, ±203, ±231}, which is defined for the 40 MHz bandwidth.

In case 2048 IFFT/FFT is applied for the 160 MHz bandwidth in the wireless LAN system according to the exemplary embodiment of the present invention, the pilot tone index that is configured for the 80 MHz bandwidth may be used. More specifically, the 160 MHz bandwidth may include two sub-80 MHz bandwidths, and the pilot tone positions corresponding to each of the two sub-80 MHz bandwidths that are included in the 160 MHz bandwidth may be configured to correspond to the positions of the pilot tone pattern, which is defined for the 80 MHz bandwidth.

Figure 3:
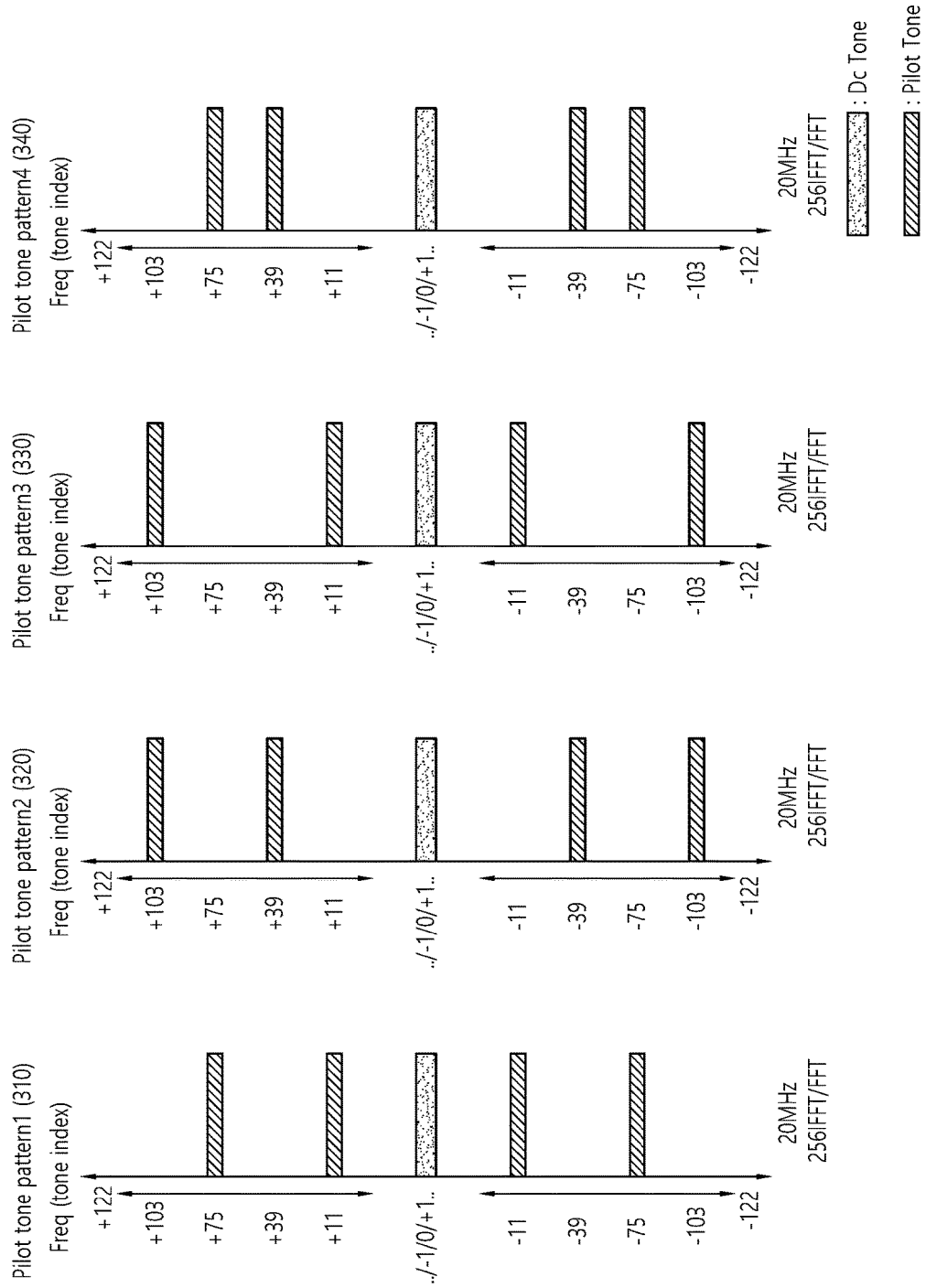
FIG. 3 is a conceptual view illustrating a pilot tone pattern according to an exemplary embodiment of the present invention.

FIG. 3 is a conceptual view illustrating a pilot tone pattern according to an exemplary embodiment of the present invention.

In FIG. 3, the pilot tone pattern according to the exemplary embodiment of the present invention may be determined based on a pilot tone pattern of the legacy (or conventional) wireless LAN system (hereinafter referred to as a conventional pilot tone pattern), which is configured when using IFFT/FFT having the same size as the increased IFFT/FFT. Most particularly, FIG. 3 discloses a method of using only a portion of the tone pilots among the tone pilots that are configured based on the conventional pilot tone pattern.

Referring to FIG. 3, in case 256 IFFT/IFFT is applied for the 20 MHz bandwidth, the conventional pilot tone pattern, which is configured for 256 IFFT/FFT that is applied to the 80 MHz bandwidth in the conventional wireless LAN system, may be re-used. Among the pilot tones that are included in the conventional pilot tone pattern that is defined in the 80 MHz bandwidth, only a portion of the corresponding pilot tones may be configured as the pilot tone pattern for the 20 MHz bandwidth in the wireless LAN system according to the exemplary embodiment of the present invention. In case of using such method for allocating pilot tones, overhead of the pilot tones may be reduced. In case the conventional pilot tone pattern (or pilot frequency index) that is defined in the 80 MHz bandwidth corresponds to {±11, ±39, ±75, ±103}, the pilot tone pattern for the 20 MHz bandwidth according to the exemplary embodiment of the present invention may be as described below.

For example, in case 256 IFFT/FFT is applied for the 20 MHz bandwidth, pilot tone pattern1 310 may correspond to {±11, ±75}. In the conventional pilot tone pattern, only a pilot tone that is positioned at an odd-number indexed position based on the DC tone may be configured as the pilot tone pattern1 310 for the 20 MHz bandwidth in the wireless LAN system according to the exemplary embodiment of the present invention.

Alternatively, in case 256 IFFT/FFT is applied for the 20 MHz bandwidth, pilot tone pattern2 320 may correspond to {±39, ±103}. In the conventional pilot tone pattern, only a pilot tone that is positioned at an even-number indexed position based on the DC tone may be configured as the pilot tone pattern2 320 for the 20 MHz bandwidth in the wireless LAN system according to the exemplary embodiment of the present invention.

Alternatively, in case 256 IFFT/FFT is applied for the 20 MHz bandwidth, pilot tone pattern3 330 may correspond to {±11, ±103}. In the conventional pilot tone pattern, only a most adjacent pilot tone of the DC tone and a most remote pilot tone of the DC tone may be configured as the pilot tone pattern3 330 for the 20 MHz bandwidth in the wireless LAN system according to the exemplary embodiment of the present invention.

Alternatively, in case 256 IFFT/FFT is applied for the 20 MHz bandwidth, pilot tone pattern4 340 may correspond to {±39, ±75}. In the conventional pilot tone pattern, only two tones positioned in the middle excluding the most adjacent pilot tone of the DC tone and the most remote pilot tone of the DC tone may be configured as the pilot tone pattern4 340 for the 20 MHz bandwidth in the wireless LAN system according to the exemplary embodiment of the present invention.

More specifically, among the 8 pilot tones that are defined in the conventional pilot tone pattern, the pilot one pattern for the 20 MHz bandwidth in the wireless LAN system according to the exemplary embodiment of the present invention may use only 4 pilot tones.

According to the exemplary embodiment of the present invention, a method for allocating pilot tones per space-time stream and the pilot tone values may be set to be identical. The pilot tone pattern/pilot tone values corresponding to one space-time stream may be applied to all space-time streams.

For example, in case 256 IFFT/FFT is applied for the 20 MHz bandwidth, the pilot pattern1 310 may correspond to {+11, ±75}, and a value of the pilot tone (or pilot coefficient or pilot sequence) may be defined as shown below in Equation 1.

$$P_n^{\{-75,-11,11,75\}} = \{\Psi_{n+1mod8}, \Psi_{n+3mod8}, \Psi_{n+4mod8}, \Psi_{n+6mod8}\}$$

$$P_n^{k \notin \{-75,-11,11,75\}} = 0 \qquad \text{<Equation 1>}$$

Alternatively, in case 256 IFFT/FFT is applied for the 20 MHz bandwidth, the pilot pattern2 320 may correspond to {±39, ±103}, and a value of the pilot tone (or pilot sequence) may be defined as shown below in Equation 2.

$$P_n^{\{-103,-39,39,103\}} = \{\Psi_{nmod8}, \Psi_{n+2mod8}, \Psi_{n+5mod8}, \Psi_{n+7mod8}\}$$

$$P_n^{k \notin \{-103,-39,39,103\}} = 0 \qquad \text{<Equation 2>}$$

Alternatively, in case 256 IFFT/FFT is applied for the 20 MHz bandwidth, the pilot pattern3 330 may correspond to {±11, ±103}, and a value of the pilot tone (or pilot sequence) may be defined as shown below in Equation 3.

$$P_n^{\{-103,-11,11,103\}} = \{\Psi_{nmod8}, \Psi_{n+3mod8}, \Psi_{n+4mod8}, \Psi_{n+7mod8}\}$$

$$P_n^{k \notin \{-103,-11,11,103\}} = 0 \qquad \text{<Equation 3>}$$

Alternatively, in case 256 IFFT/FFT is applied for the 20 MHz bandwidth, the pilot pattern4 340 may correspond to {±39, ±75}, and a value of the pilot tone (or pilot sequence) may be defined as shown below in Equation 4.

$$P_n^{\{-75,-39,39,75\}} = \{\Psi_{n+1mod8}, \Psi_{n+2mod8}, \Psi_{n+5mod8}, \Psi_{n+6mod8}\}$$

$$P_n^{k \notin \{-75,-39,39,75\}} = 0 \qquad \text{<Equation 4>}$$

The value of the pilot tone (or pilot coefficient) may correspond to a value of the pilot tone (or pilot sequence) within the 80 MHz bandwidth that is defined in the conventional wireless LAN system.

For example, a value of $\Psi_n$ may be defined as $\{\Psi_0, \Psi_1, \Psi_2, \Psi_3, \Psi_4, \Psi_5, \Psi_6, \Psi_7\} = \{1,1,1,-1,-1,1,1,1\}$.

Figure 4:
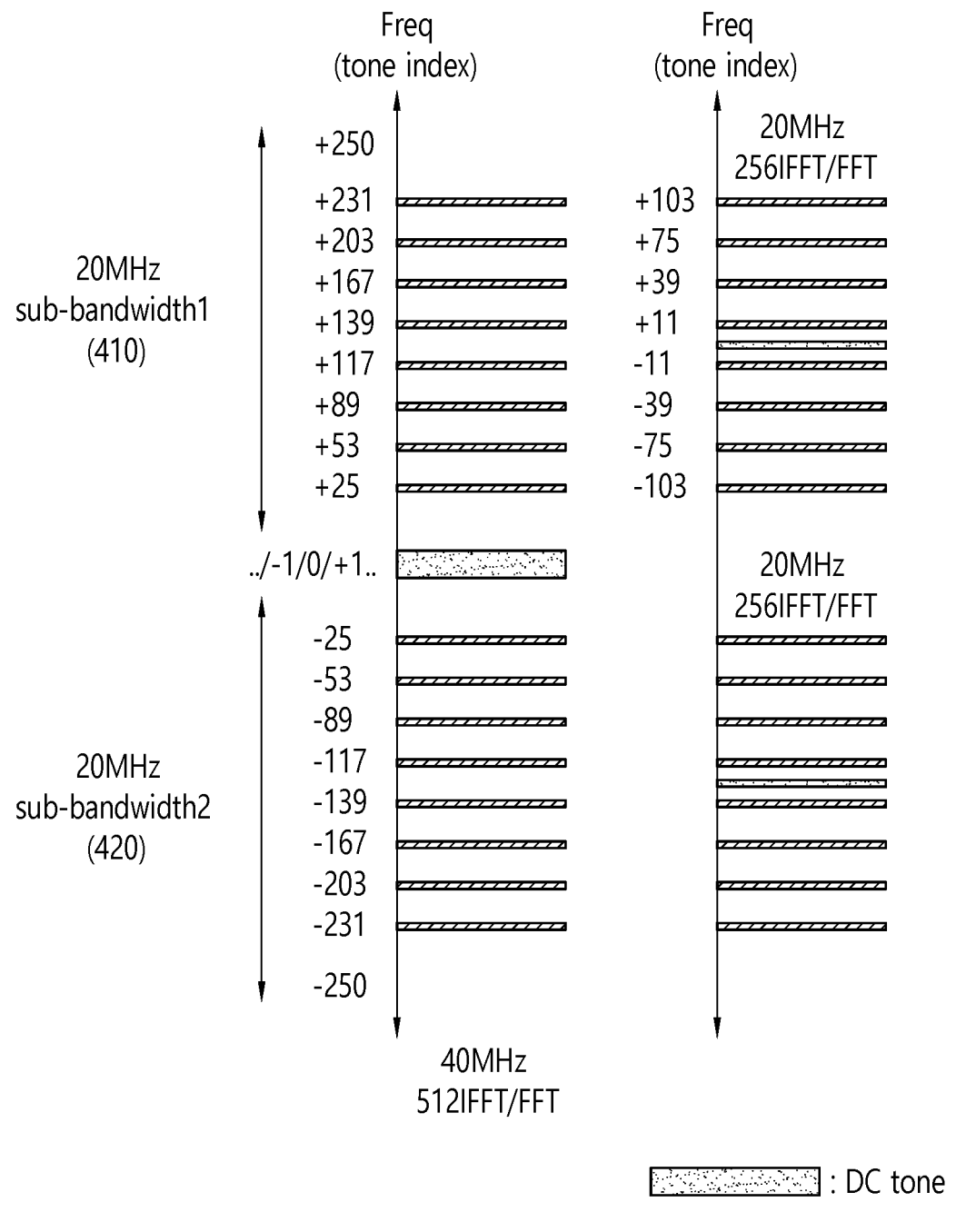
FIG. 4 is a conceptual view illustrating a pilot tone pattern according to an exemplary embodiment of the present invention.

FIG. 4 is a conceptual view illustrating a pilot tone pattern according to an exemplary embodiment of the present invention.

FIG. 4 discloses a pilot tone pattern that is configured for a bandwidth that is larger than the 20 MHz bandwidth.

Referring to FIG. 4, the pilot tone pattern for the 20 MHz bandwidth, which is defined in FIG. 2, may be extended and applied to the bandwidth that is larger than the 20 MHz bandwidth.

For example, in case of applying 512 IFFT/FFT for a 40 MHz bandwidth, the pilot tone pattern for the 20 MHz bandwidth may be repeated two times (or twice).

The 40 MHz bandwidth may include two 20 MHz sub-bandwidths 410 and 420, and each of the two 20 MHz sub-bandwidths 410 and 420 may have a pilot tone pattern corresponding to the pilot tone pattern for the 20 MHz bandwidth, which is defined in FIG. 2. More specifically, the position of the pilot tone being included in the pilot tone pattern for each of the two 20 MHz sub-bandwidths 410 and 420 may correspond to $\{\pm 11, \pm 39, \pm 75, \pm 103\}$ based on a specific subcarrier. More specifically, although the specific numbers of the pilot tone pattern (or pilot frequency index) may vary, the pilot tone may be allocated within each of the two 20 MHz sub-bandwidths at an interval between pilot tones that is the same as the pilot tone pattern $\{\pm 11, \pm 39, \pm 75, \pm 103\}$.

Similarly, by using the same method, as another example, in case of applying 1024 IFFT/FFT for an 80 MHz bandwidth, the pilot tone pattern for the 40 MHz bandwidth may be repeated two times (or twice), or the pilot tone pattern for the 20 MHz bandwidth may be repeated four times. The 80 MHz bandwidth may include four 20 MHz sub-bandwidths, and each of the four 20 MHz sub-bandwidths may have a pilot tone pattern corresponding to the pilot tone pattern for the 20 MHz bandwidth, which is defined in FIG. 2. More specifically, the pilot tone may be allocated within each of the four 20 MHz sub-bandwidths at an interval between pilot tones that is the same as the pilot tone pattern $\{\pm 11, \pm 39, \pm 75, \pm 103\}$.

Figure 5:
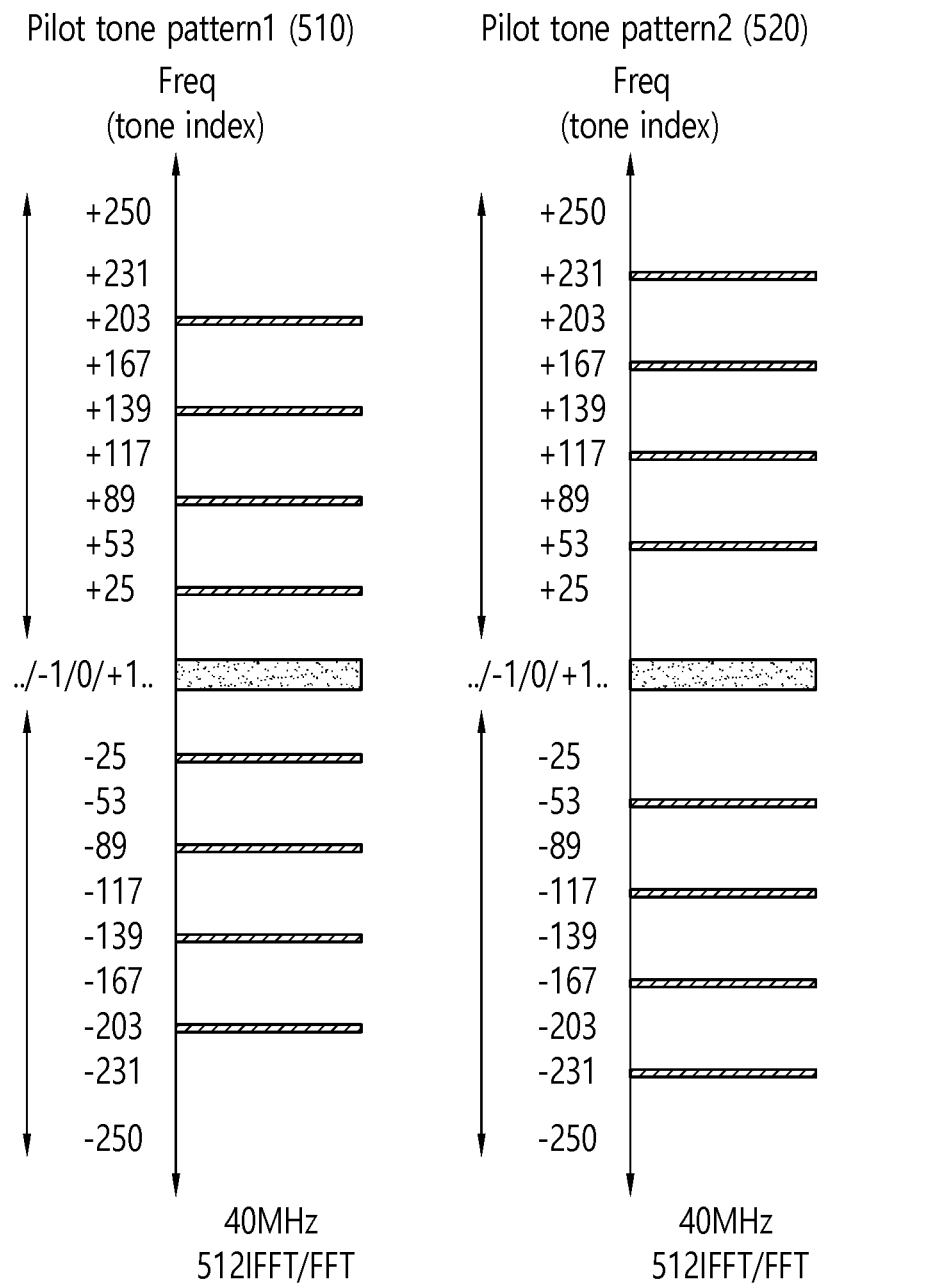
FIG. 5 is a conceptual view illustrating a pilot tone pattern according to an exemplary embodiment of the present invention.

FIG. 5 is a conceptual view illustrating a pilot tone pattern according to an exemplary embodiment of the present invention.

FIG. 5 discloses a method for using a pilot tone pattern that is defined for a 160 MHz bandwidth in the conventional wireless LAN system.

Referring to FIG. 5, 512 IFFT/FFT may be applied for the 160 MHz bandwidth in the conventional wireless LAN system. The conventional pilot tone (or pilot frequency index) for the 160 MHz bandwidth to which the 512 IFFT/FFT is applied may be configured as $\{\pm 25, \pm 53, \pm 89, \pm 117, \pm 139, \pm 167, \pm 203, \pm 231\}$.

In this case, the pilot tone pattern for the 40 MHz bandwidth applying 512 IFFT/FFT in the wireless LAN system according to the exemplary embodiment of the present invention may be determined based on the conventional pilot tone pattern for the 160 MHz bandwidth of the conventional wireless LAN system.

For example, pilot tone pattern1 for the 40 MHz bandwidth applying 512 IFFT/FFT in the wireless LAN system may be configured of $\{\pm 25, \pm 89, \pm 139, \pm 203\}$, which correspond only to odd-number indexed pilot tones being extracted from the conventional pilot tone pattern for the 160 MHz bandwidth applying 512 IFFT/FFT.

The value of the pilot tone being allocated by the pilot tone pattern $\{\pm 25, \pm 89, \pm 139, \pm 203\}$ may be defined as shown below in Equation 5.

$$P_n^{\{-203,-139,-89,-25,25,89,139,203\}} = \{\Psi_{n+1 mod 8}, \Psi_{n+3 mod 8}, \Psi_{n+5 mod 8}, \Psi_{n+7 mod 8}, \Psi_{n mod 8}, \Psi_{n+2 mod 8}, \Psi_{n+4 mod 8}, \Psi_{n+6 mod 8}\}$$

$$P_n^{k \notin \{-203,-139,-89,-25,25,89,139,203\}} = 0 \qquad \text{<Equation 5>}$$

As another example, pilot tone pattern2 for the 40 MHz bandwidth applying 512 IFFT/FFT in the wireless LAN system may be configured of $\{\pm 53, \pm 117, \pm 167, \pm 231\}$, which correspond only to even-number indexed pilot tones being extracted from the conventional pilot tone pattern for the 160 MHz bandwidth applying 512 IFFT/FFT.

The value of the pilot tone being allocated by the pilot tone pattern $\{\pm 53, \pm 117, \pm 167, \pm 231\}$ may be defined as shown below in Equation 6.

$$P_n^{\{-231,-167,-117,-53,53,117,167,231\}} = \{\Psi_{n mod 8}, \Psi_{n+2 mod 8}, \Psi_{n+4 mod 8}, \Psi_{n+6 mod 8}, \Psi_{n+1 mod 8}, \Psi_{n+3 mod 8}, \Psi_{n+5 mod 8}, \Psi_{n+7 mod 8}\}$$

$$P_n^{k \notin \{-231,-167,-117,-53,53,117,167,231\}} = 0 \qquad \text{<Equation 6>}$$

The value of the pilot tone (or pilot coefficient) may correspond to a value of the pilot tone (or pilot sequence) within the 160 MHz bandwidth that is defined in the conventional wireless LAN system.

For example, a value of $\Psi_n$ may be defined as $\{\Psi_0, \Psi_1, \Psi_2, \Psi_3, \Psi_4, \Psi_5, \Psi_6, \Psi_7\} = \{1,1,1,-1,-1,1,1,1\}$.

Figure 6:
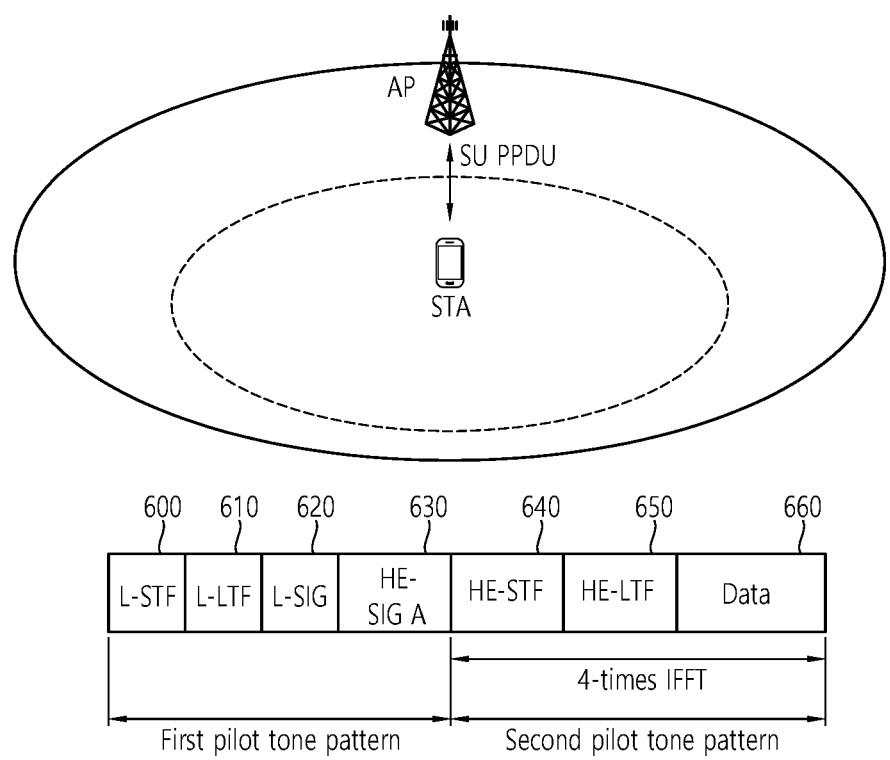
FIG. 6 is a conceptual view illustrating a SU PPDU format according to an exemplary embodiment of the present invention.

FIG. 6 is a conceptual view illustrating a SU PPDU format according to an exemplary embodiment of the present invention.

FIG. 6 discloses a SU PPDU format being transmitted by an AP to an STA (or being transmitted by an STA to an AP) according to the exemplary embodiment of the present invention.

Referring to FIG. 6, a PPDU header of a SU PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a data field (or medium access control (MAC) payload). The PPDU may be divided into a legacy part, which consists of a part starting from the PHY header to the L-SIG, and a high efficiency (HE) part, which consists of a part after the L-SIG.

The L-STF 600 may include a short training orthogonal frequency division multiplexing (OFDM) symbol. The L-STF 600 may be used for frame detection, automatic gain control (AGC), diversity detection, and coarse frequency/time synchronization.

The L-LTF 610 may include a long training orthogonal frequency division multiplexing (OFDM) symbol. The L-LTF 610 may be used for fine frequency/time synchronization and channel prediction.

The L-SIG 620 may be used for transmitting control information. The L-SIG 620 may include information on data transmission rate, data length, and so on.

The HE-SIG A 630 may also include information for indicating an STA/AP that is to receive the SU PPDU. For example, the HE-SIG A 630 may include an identifier of a specific STA (or AP) that is to receive the SU PPDU and information for indicating a group of specific STAs.

Additionally, the HE-SIG A 630 may also include color bits information for BSS identification information, bandwidth information, tail bit, cyclic redundancy check (CRC) bit, and cyclic prefix (CP) (or guard interval (GI)) length information.

The HE-STF 640 may be used for enhancing automatic gain control estimation in a multiple input multiple output (MIMO) environment or an OFDMA/OFDM environment.

The HE-LTF 650 may be used for estimating a channel in a MIMO environment or an OFDMA/OFDM environment.

The inverse fast fourier transform (IFFT) size being applied to the HE-STF 640 and the field after the HE-STF 640 may be different from the IFFT size being applied to the field before the HE-STF 640. For example, the IFFT size being applied to the HE-STF 640 and the field after the HE-STF 640 may be 4 times larger than the IFFT size being applied to the field before the HE-STF 640. In case the STA may receive the HE-SIG A 630 and may receive indication to receive a downlink PPDU based on the HE-SIG A 630. In this case, the STA may perform decoding based on the HE-STF 640 and the FFT size that is changed starting from the field after the HE-STF 640. Conversely, in case the STA fails to receive indication to receive the downlink PPDU based on the HE-SIG A 630, the STA may stop the decoding process and may perform network allocation vector (NAV) configuration. A cyclic prefix (CP) of the HE-STF 640 may have a size that is larger than the CP of other fields, and, during such CP period, the STA may change the FFT size and may perform decoding on the downlink PPDU.

Unlike the DL MU PPDU/UL MU PPDU format, which will be described later on in more detail, the SU PPDU format may not include a HE-SIG B. In case a non-increased IFFT is used in the field before the HE-STF 640, the conventional pilot tone pattern may be used, and in case the increased IFFT is used in the HE-STF 640 and the field after the HE-STF 640, a pilot tone pattern that is newly defined in the exemplary embodiment of the present invention may be used.

A data field 660 may include a frame (MPDU).

Figure 7:
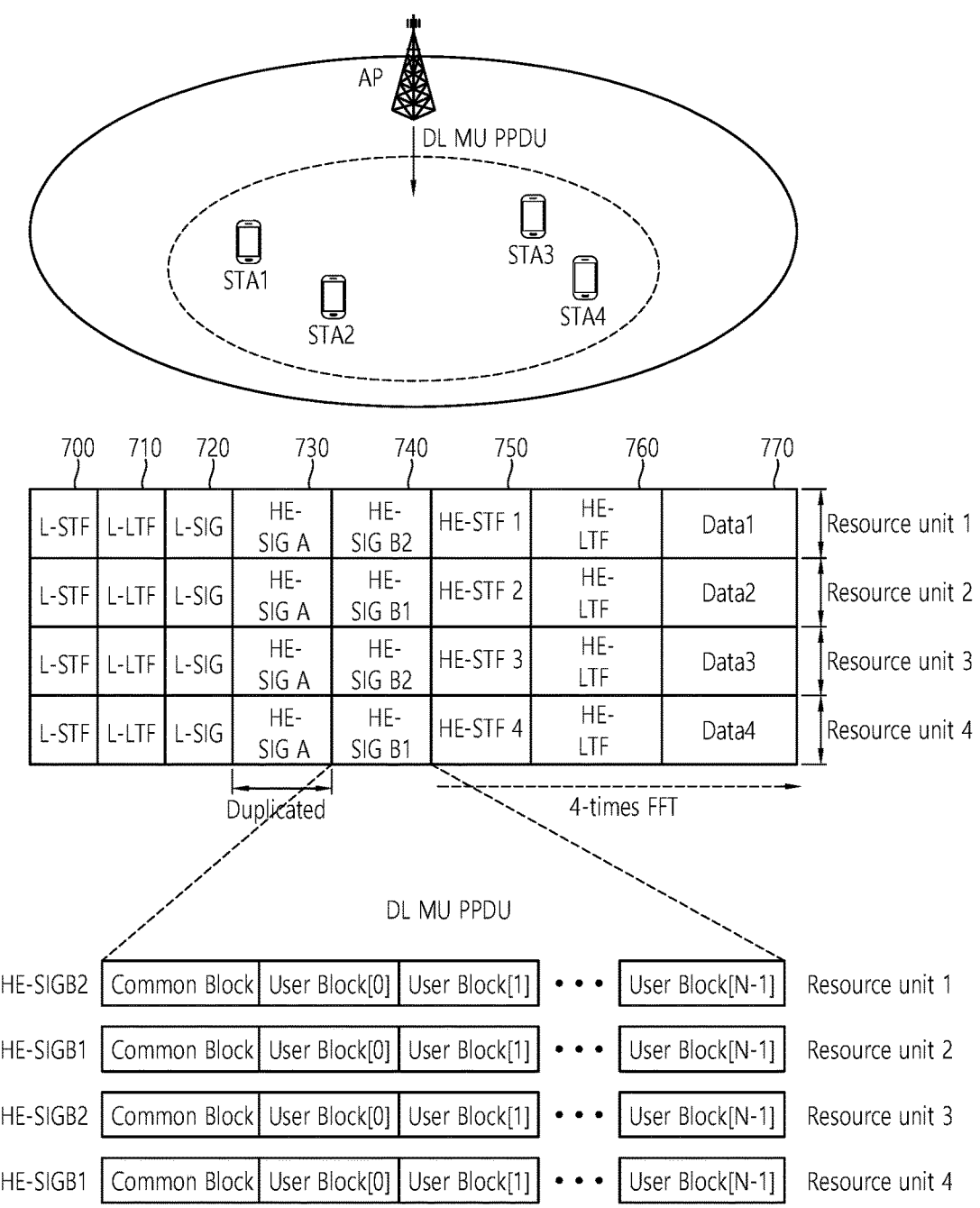
FIG. 7 is a conceptual view illustrating a DL MU PPDU format according to an exemplary embodiment of the present invention.

FIG. 7 is a conceptual view illustrating a DL MU PPDU format according to an exemplary embodiment of the present invention.

FIG. 7 discloses a DL U PPDU format that is transmitted by the AP based on OFDMA according to the exemplary embodiment of the present invention.

Referring to FIG. 7, a PPDU header of a DL MU PPDU may include a legacy-short training field (L-STF), a legacy-long training field (L-LTF), a legacy-signal (L-SIG), a high efficiency-signal A (HE-SIG A), a high efficiency-signal B (HE-SIG B), a high efficiency-short training field (HE-STF), a high efficiency-long training field (HE-LTF), and a data field (or MAC payload). The PPDU may be divided into a legacy part, which consists of a part starting from the PHY header to the L-SIG, and a high efficiency (HE) part, which consists of a part after the L-SIG.

The L-STF 700 may include a short training orthogonal frequency division multiplexing (OFDM) symbol. The L-STF 700 may be used for frame detection, automatic gain control (AGC), diversity detection, and coarse frequency/time synchronization.

The L-LTF 710 may include a long training orthogonal frequency division multiplexing (OFDM) symbol. The L-LTF 710 may be used for fine frequency/time synchronization and channel prediction.

The L-SIG 720 may be used for transmitting control information. The L-SIG 720 may include information on data transmission rate, data length, and so on.

The HE-SIG A 730 may also include identification information for indicating a target STA that is to receive the DL MU PPDU. For example, the HE-SIG A 730 may include an identifier indicating whether the transmitted PPDU is transmitted via DL transmission or UL transmission, an identifier of a specific STA (or AP) that is to receive the PPDU and information for indicating a group of specific STAs. Also, in case the DL MU PPDU is transmitted based on OFDMA or MIMO, the HE-SIG A 730 may also include resource allocation information for the reception of the DL MU PPDU by the STA.

Additionally, the HE-SIG A 730 may also include color bits information for BSS identification information, bandwidth information, transmission opportunity (TXOP) duration information, tail bit, CRC bit, modulation and coding scheme (MCS) information on the HE-SIG B 740, information on the number of symbols for the HE-SIG B 740, and cyclic prefix (CP) (or guard interval (GI)) length information.

Additionally, the HE-SIG A 730 may have a repeat mode in order to extend the transmission range. In case the repeat mode is used in the HE-SIG A 730, usage of the repeat mode before the HE-SIG A 730 may be indicated. In the repeat mode, the HE-SIG A 730 may be repeated once (or 1 time). A bit interleaver may be bypassed by a repeated HE-SIG A symbol.

The HE-SIG B 740 may include information on a length modulation and coding scheme (MCS) of a physical layer service data unit (PSDU) for each STA and a tail bit, and so on. Additionally, the HE-SIG B 740 may also include information on the STA that is to receive the PPDU and resource allocation information based on OFDMA (or MU-MIMO information). In case the resource allocation information based on OFDMA (or MU-MIMO information) is included in the HE-SIG B 740, the resource allocation information may not be included in the HE-SIG A 730.

The fields before the HE-SIG B 740 within the DL MU PPDU may each be transmitted from different transmission resources in a duplicated format. In case of the HE-SIG B 740, the HE-SIG B 740 being transmitted from part of the resource units (e.g., resource unit 1 and resource unit 2) may correspond to an independent field including separate information, and the HE-SIG B 740 being transmitted from the remaining resource units (e.g., resource unit 3 and resource unit 4) may correspond to a duplicated format of the HE-SIG B 740, which is transmitted from another resource unit (e.g., resource unit 1 and resource unit 2).

More specifically, the HE-SIG B 740 may include a common block and a plurality of user blocks. The common block may include information on the resource allocation, and the user block may include per STA specific information (or user specific information). A separate CRC may be defined for the common block, and separate CRCs may be respectively defined for each of a predetermined number of the plurality of user blocks. For example, a case when the HE-SIG B 740 includes 1 common block and 5 user blocks (user block1 to user block 5) and when a CRC for the user block is defined for each unit of 2 user blocks may be assumed herein. In this case, CRC1 for the common block, CRC2 for user block1 and user block2, CRC3 for user block3 and user block4, and CRC4 for user block5 may be included in the HE-SIG B.

Each of the plurality of block included in the HE-SIG B 740, which is transmitted from one resource unit, may include information on a plurality of users. For example, user block1 may include user specific information corresponding to STA1 and STA2, and user block2 may include user specific information corresponding to STA3 and STA4.

Each of HE SIG B1 being transmitted from resource unit1 and HE SIG B2 being transmitted from resource unit2 may correspond to a HE SIG B including different types of information. For example, HE SIG B1 being transmitted from resource unit1 may include common blocks and user blocks correspond to each of STA1 and STA2, and HE SIG B2 being transmitted from resource unit2 may include common blocks and user blocks correspond to each of STA3 and STA4. As described above, HE SIG B1 that is transmitted from resource unit3 may be generated by duplicating HE SIG B1, which is transmitted from resource unit1. And, HE SIG B2 that is transmitted from resource unit4 may be generated by duplicating HE SIG B2, which is transmitted from resource unit2.

The HE-STF 750 may be used for enhancing automatic gain control estimation in a multiple input multiple output (MIMO) environment or an OFDMA environment.

More specifically, STA1 may receive HE-STF1, which is transmitted from the AP through resource unit1 and may then perform synchronization, channel tracking/estimation, and AGC, thereby being capable of decoding data field1 (or frame 1). Similarly, STA2 may receive HE-STF2, which is transmitted from the AP through resource unit2 and may then perform synchronization, channel tracking/estimation, and AGC, thereby being capable of decoding data field2 (or frame2). STA3 may receive HE-STF3, which is transmitted from the AP through resource unit3 and may then perform synchronization, channel tracking/estimation, and AGC, thereby being capable of decoding data field3 (or frame3). And, STA4 may receive HE-STF4, which is transmitted from the AP through resource unit4 and may then perform synchronization, channel tracking/estimation, and AGC, thereby being capable of decoding data field4 (or frame4).

The HE-LTF 760 may be used for estimating a channel in a MIMO environment or an OFDMA environment.

The inverse fast fourier transform (IFFT) size being applied to the HE-STF 750 and the field after the HE-STF 750 may be different from the IFFT size being applied to the field before the HE-STF 750. For example, the IFFT size being applied to the HE-STF 750 and the field after the HE-STF 750 may be 4 times larger than the IFFT size being applied to the field before the HE-STF 750. In case the STA may receive the HE-SIG A 730 and may receive indication to receive a downlink PPDU based on the HE-SIG A 730. In this case, the STA may perform decoding based on the HE-STF 750 and the FFT size that is changed starting from the field after the HE-STF 750. Conversely, in case the STA fails to receive indication to receive the downlink PPDU based on the HE-SIG A 730, the STA may stop the decoding process and may perform network allocation vector (NAV) configuration. A cyclic prefix (CP) of the HE-STF 750 may have a size that is larger than the CP of other fields, and, during such CP period, the STA may change the FFT size and may perform decoding on the downlink PPDU.

The access point (AP) may allocate each of the plurality of the resource units to each of the plurality of stations (STAs) within the entire bandwidth and may transmit individual data fields (or frames), which correspond to each of the plurality of STAs, to each of the plurality of STAs through each of the plurality of resource units. As described above, the information on the allocation of each of the plurality of resource units to each of the plurality of STAs may be included in the HE-SIG A 730 or the HE-SIG B 760.

Similarly, in case a non-increased IFFT is used in the field before the HE-STF 750, the conventional pilot tone pattern may be used, and in case the increased IFFT is used in the HE-STF 750 and the field after the HE-STF 750, a pilot tone pattern that is newly defined in the exemplary embodiment of the present invention may be used.

Figure 8:
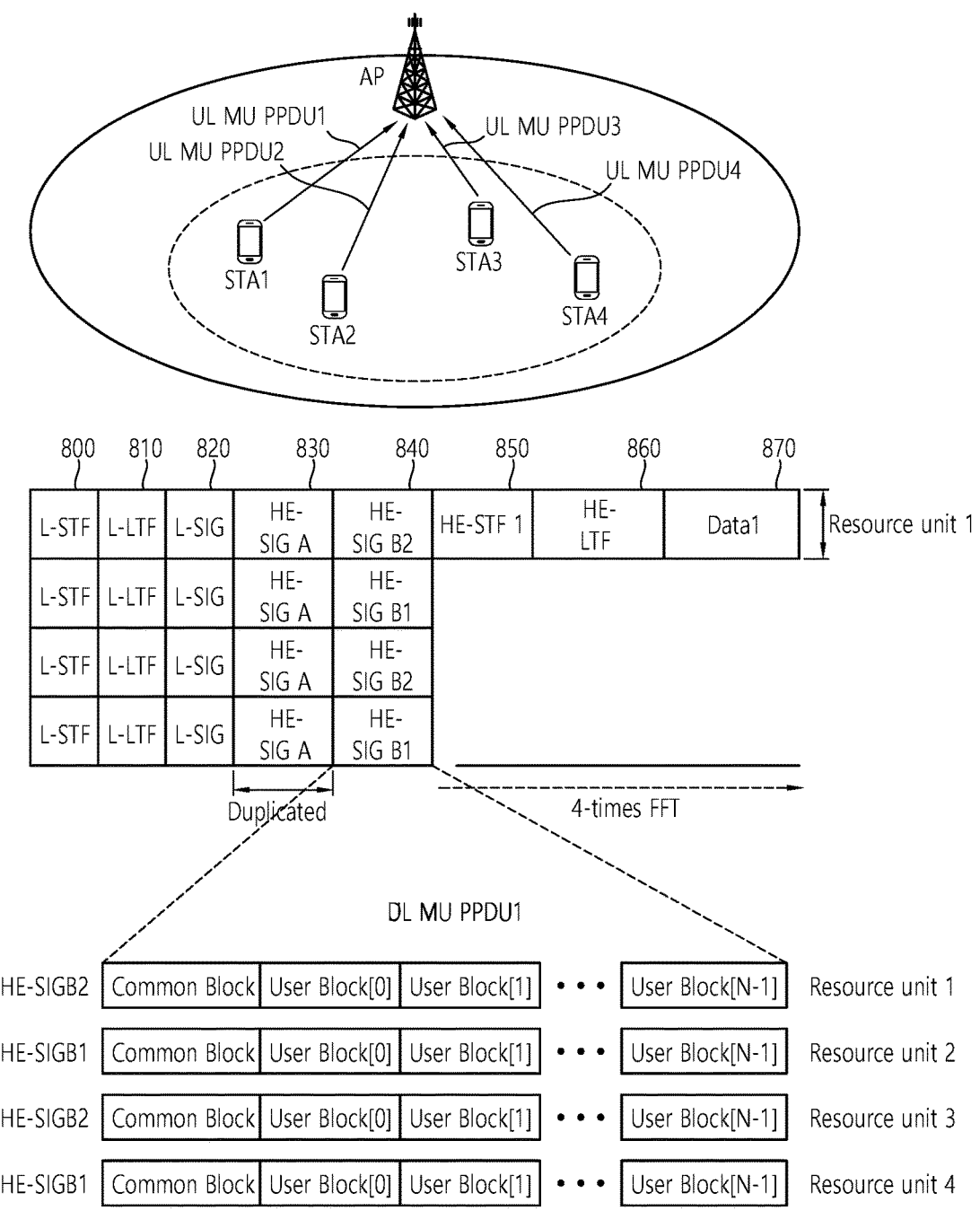
FIG. 8 is a conceptual view illustrating a transmission of a UL MU PPDU according to an exemplary embodiment of the present invention.

FIG. 8 is a conceptual view illustrating a transmission of a UL MU PPDU according to an exemplary embodiment of the present invention.

Referring to FIG. 8, a plurality of STAs may transmit a UL MU PPDU to the AP based on UL MU OFDMA.

The L-STF 800, the L-LTF 810, the L-SIG 820, the HE-SIG A 830, and the HE-SIG B 840 may perform the functions, which are disclosed in FIG. 7. The information that is included in the signal field (L-SIG 820, HE-SIG A 830, and HE-SIG B 840) may be generated based on the information included in the signal field of the received DL MU PPDU.

STA1 may perform uplink transmission through the entire bandwidth up to HE-SIG B 840, and, then, STA1 may perform uplink transmission through the allocated bandwidth starting from HE-STF 850. STA1 may deliver (or carry) an uplink frame through the allocated bandwidth (e.g., resource unit1) based on a UL MU PPDU. The AP may allocate an uplink resource corresponding to each of the plurality of STAs based on a DL MU PPDU (e.g., HE-SIG A/B), and each of the plurality of STAs may receive the corresponding uplink resource and then transmit a UL MU PPDU.

Similarly, in case a non-increased IFFT is used in the field before the HE-STF 850, the conventional pilot tone pattern may be used, and in case the increased IFFT is used in the HE-STF 850 and the field after the HE-STF 850, a pilot tone pattern that is newly defined in the exemplary embodiment of the present invention may be used.

Figure 9:
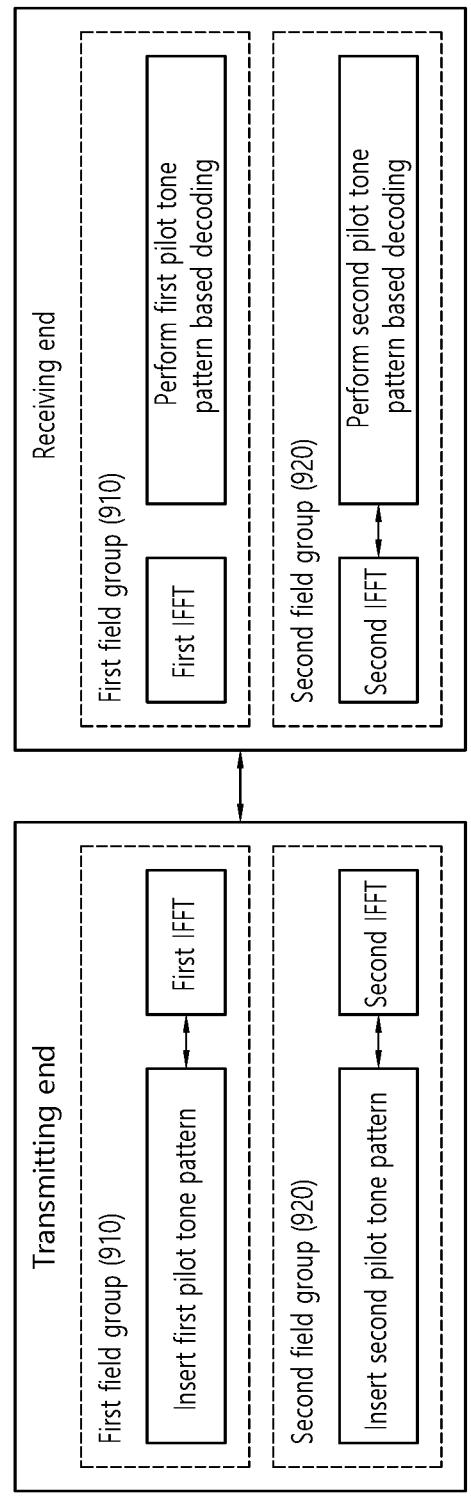
FIG. 9 is a conceptual view illustrating a method for receiving a PPDU according to an exemplary embodiment of the present invention.

FIG. 9 is a conceptual view illustrating a method for receiving a PPDU according to an exemplary embodiment of the present invention.

FIG. 9 discloses a method for performing encoding/decoding on a PPDU based on the IFFT/FFT that is used in the PPDU.

Referring to FIG. 9, a first PPDU may include a first pilot tone pattern as a resource unit that is generated based on a first IFFT. In case the PPDU is generated based on the first IFFT, the first pilot tone pattern may be used. The first pilot tone pattern may correspond to the conventional pilot tone pattern.

A second PPDU may include a first pilot tone pattern and a second pilot tone pattern as resource units generated based on a first IFFT/second IFFT. As described above, the second IFFT may be applied to a second field group (e.g., HE-STF and field after the HE-STF), and the first IFFT may be applied to a first field group (e.g., field before the HE-STF). In the second PPDU, the first pilot tone pattern, which corresponds to the conventional pilot tone pattern, may be used in the first field group wherein the first IFFT is used, and the second pilot tone pattern, which corresponds to the pilot tone pattern according to the exemplary embodiment of the present invention that is described in FIG. 2 to FIG. 6, may be used in the second field group wherein the second IFFT is used. A size of the second IFFT may correspond to n times (wherein n is an integer equal to 2 or more) the size of the first IFFT.

The STA that has received the PPDU may determine whether the received PPDU corresponds to the first PPDU or the second PPDU.

In case the PPDU corresponds to the first PPDU, the STA/AP may perform decoding by converting (or transforming) the received PPDU based on the first FFT. At this point, the STA may decode the PPDU based on a result of performing channel estimation and phase tracking based on the first pilot tone pattern.

Conversely, in case the PPDU corresponds to the second PPDU, the STA may perform decoding by converting (or transforming) the received PPDU based on the first FFT and the second FFT. The STA may convert the PPDU by applying the first FFT to a field (e.g., field before the HE-STF) that is included in the first field group, and the STA may convert the PPDU by applying the second FFT to the second field group (e.g., HE-STF and field after the HE-STF).

At this point, the STA may decode the field before the HE-STF, which is included in the second PPDU, by using a result of performing channel estimation and phase tracking based on the first pilot tone pattern, and the STA may decode the HE-STF and the field after the HE-STF, which are included in the second PPDU, by using the second pilot tone pattern based on a result of performing channel estimation and phase tracking by using the second pilot tone pattern.

In the viewpoint of the frame, the following frame decoding procedure may be performed as described below.

The data field excluding the PPDU header may correspond to an MPDU, which is generated by a MAC layer. The MPDU may be expressed differently by using the term frame.

Therefore, the first PPDU may include a first frame, which is converted based on the first IFFT, and the second PPDU may include a second frame, which is converted based on the second IFFT.

The STA/AP may determine whether the first IFFT is applied to the frame or whether the second IFFT is applied to the frame. In case the first IFFT is applied to the frame, the STA/AP may decode the frame based on a first pilot tone, which is allocated based on a first pilot tone allocation. And, in case the second IFFT is applied to the frame, the STA/AP may decode the frame based on a second pilot tone, which is allocated based on a second pilot tone allocation.

The AP may adaptively transmit PPDUs, which are generated based on different pilot tone patterns, in accordance with the corresponding STA as described below.

The AP may transmit the first PPDU, which includes a first data field (or first frame or first MPDU) that is generated based on the first pilot tone pattern (i.e., the conventional pilot tone pattern), through a first frequency band to a first STA supporting the conventional pilot tone pattern. And, the AP may be configured to transmit the second PPDU, which includes a second data field (or second frame or second MPDU) that is generated based on the second pilot tone pattern, through a second frequency band to a second STA supporting the pilot tone pattern according to the exemplary embodiment of the present invention.

At this point, a size of the first frequency bandwidth may be n times (herein, n is an integer that is equal to or greater than 2, e.g., 4) larger than the size of the second frequency bandwidth, and the IFFT size being applied to the first data field may be the same as the IFFT size being applied to the second data field. Additionally, the first pilot tone pattern may include a plurality of first pilot tones, and each of the plurality of first pilot tones may be respectively allocated to each of a plurality of first pilot tone indexes. And, the second pilot tone pattern may include a plurality of second pilot tones, and each of the plurality of second pilot tones may be respectively allocated to each of a plurality of second pilot tone indexes. In this case, among the plurality of first pilot tone indexes, part of the first pilot tone indexes may be the same as the plurality of second pilot tone indexes.

A pilot tone index may refer to an index having a positive value that increases in a direction along which the frequency increases based on a direct current (DC) tone and being mapped to each of a plurality of tones, or to an index having a negative value that decreases in a direction along which the frequency decreases based on the DC tone and being mapped to each of a plurality of tones.

More specifically, for example, the AP may be adaptively operated, as described below, in accordance with the wireless LAN system that is supported by the corresponding STA. The AP may insert the conventional pilot tone pattern within the 80 MHz bandwidth and may then transmit the first PPDU, which is inversely converted (or transformed) based on 256 IFFT, to the first STA. Also, the AP may insert the pilot tone pattern according to the exemplary embodiment of the present invention within the 20 MHz bandwidth and may then transmit the PPDU, which is inversely converted (or transformed) based on 256 IFFT. At this point, in this case, among the plurality of first pilot tone indexes that are configured based on the conventional pilot tone pattern, part of the first pilot tone indexes may be the same as the plurality of second pilot tone indexes.

Figure 10:
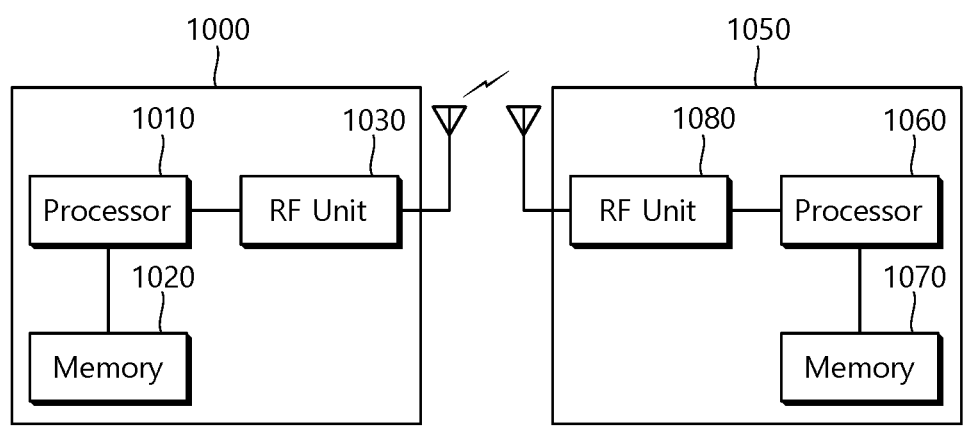
FIG. 10 is a block view illustrating a wireless device to which the exemplary embodiment of the present invention can be applied.

FIG. 10 is a block view illustrating a wireless device to which the exemplary embodiment of the present invention can be applied.

Referring to FIG. 10, as an STA that can implement the above-described exemplary embodiment, the wireless device may correspond to an AP 1000 or a non-AP station (STA) 1050.

The AP 1000 includes a processor 1010, a memory 1020, and a radio frequency (RF) unit 1030.

The RF unit 1030 is connected to the processor 1010, thereby being capable of transmitting and/or receiving radio signals.

The processor 1010 implements the functions, processes, and/or methods proposed in the present invention. For example, the processor 1010 may be implemented to perform the operations of the AP according to the above-described exemplary embodiments of the present invention. The processor may perform the operations of the AP, which are disclosed in the exemplary embodiments of FIG. 1 to FIG. 9.

For example, the processor 1010 may be configured to transmit a first PPDU that is generated by using a first pilot tone pattern based on a first IFFT within the same bandwidth in accordance with the wireless LAN system, which is supported by the corresponding STA, or the processor 1010 may be configured to transmit a second PPDU that is generated by using a second pilot tone pattern, which is based on a first IFFT and a second IFFT.

The detailed operation of the processor 1010 for generating and transmitting the second PPDU may be as described below. The processor 1010 may allocate a first pilot tone that is based on the first pilot tone pattern within a frequency resource for the first field group, and the processor 1010 may allocate a second pilot tone that is based on the second pilot tone pattern within a frequency resource for the second field group.

Additionally, the processor 1010 may be configured to perform inverse transform (or conversion) on the first field group being included in the PPDU by applying the first IFFT and to perform inverse transform (or conversion) on the second field group being included in the PPDU by applying the second IFFT and, then, to transmit the PPDU including the first field group and the second field group to the STA.

The first field group may include the HT-STF and a field that is positioned before the HT-STF, among the fields configuring the PPDU, and the second field group may include a field that is positioned after the HT-STF, among the fields configuring the PPDU.

In the viewpoint of the frame, according to the wireless LAN system that is supported by the STA, the processor 1010 may transmit a first frame that is generated by using the conventional first pilot tone pattern based only on the first IFFT, or the processor 1010 may transmit a second frame that is generated by using the second pilot tone pattern based on the second IFFT.

The size of the second IFFT may correspond to n times (wherein n is an integer equal to 2 or more, e.g., 4 times) larger than the size of the first IFFT.

The processor 1010 may be configured to transmit the first PPDU including the first data field (or first frame or first MPDU) through the first frequency band to the first STA supporting the conventional pilot tone pattern and to transmit the second PPDU including the second data field (or second frame or second MPDU) through the second frequency band to the second STA supporting the pilot tone pattern according to the exemplary embodiment of the present invention.

At this point, a size of the first frequency bandwidth may be n times (herein, n is an integer that is equal to or greater than 2, e.g., 4) larger than the size of the second frequency bandwidth, and the IFFT size being applied to the first data field may be the same as the IFFT size being applied to the second data field. Additionally, the first pilot tone pattern may include a plurality of first pilot tones, and each of the plurality of first pilot tones may be respectively allocated to each of a plurality of first pilot tone indexes. And, the second pilot tone pattern may include a plurality of second pilot tones, and each of the plurality of second pilot tones may be respectively allocated to each of a plurality of second pilot tone indexes. In this case, among the plurality of first pilot tone indexes, part of the first pilot tone indexes may be the same as the plurality of second pilot tone indexes. Herein, a pilot tone index may have a positive value that increases in a direction along which the frequency increases based on a direct current (DC) tone and may be mapped to each of a plurality of tones, or a pilot tone index may have a negative value that decreases in a direction along which the frequency decreases based on the DC tone and may be mapped to each of a plurality of tones.

More specifically, a plurality of the second pilot tone indexes may be the same as odd-number indexed pilot tone indexes of odd-numbered pilot tones, which are located at odd-number indexed positions based on the DC tone, among the plurality of first pilot tones. Alternatively, a plurality of the second pilot tone indexes may be the same as even-number indexed pilot tone indexes of even-numbered pilot tones, which are located at even-number indexed positions based on the DC tone, among the plurality of first pilot tones.

For example, in case the size of the first frequency bandwidth is equal to 80 MHz, the plurality of first pilot tone indexes may correspond to $\{\pm 11, \pm 39, \pm 75, \pm 103\}$. In this case, in case the size of the second frequency bandwidth is equal to 20 MHz, and in case the plurality of second pilot tone indexes are the same as the odd-number indexed pilot tone indexes among the plurality of first pilot tones, the pilot tone indexes of the second pilot tones may correspond to $\{\pm 11, \pm 75\}$. Additionally, in case the size of the second frequency bandwidth is equal to 20 MHz, and in case the plurality of second pilot tone indexes are the same as the even-number indexed pilot tone indexes among the plurality of first pilot tones, the pilot tone indexes of the second pilot tones may correspond to $\{\pm 39, \pm 103\}$.

As another example, in case the size of the first frequency bandwidth is equal to 160 MHz, the plurality of first pilot tone indexes may correspond to $\{\pm 25, \pm 53, \pm 89, \pm 117, \pm 139, \pm 167, \pm 203, \pm 231\}$. In this case, in case the size of the second frequency bandwidth is equal to 40 MHz, and in case the plurality of second pilot tone indexes are the same as the odd-number indexed pilot tone indexes among the plurality of first pilot tones, the pilot tone indexes of the second pilot tones may correspond to $\{\pm 25, \pm 89, \pm 139, \pm 203\}$. Additionally, in case the size of the second frequency bandwidth is equal to 20 MHz, and in case the plurality of second pilot tone indexes are the same as the even-number indexed pilot tone indexes among the plurality of first pilot tones, the pilot tone indexes of the second pilot tones may correspond to $\{\pm 53, \pm 117, \pm 167, \pm 231\}$.

The STA 1050 includes a processor 1060, a memory 1070, and a radio frequency (RF) unit 1080.

The RF unit 1080 is connected to the processor 1060, thereby being capable of transmitting and/or receiving radio signals.

The processor 1060 implements the functions, processes, and/or methods proposed in the present invention. For example, the processor 1060 may be implemented to perform the operations of the STA according to the above-described exemplary embodiments of the present invention. The processor may perform the operations of the STA, which are disclosed in the exemplary embodiments of FIG. 1 to FIG. 9.

For example, the processor 1060 may be configured to receive a PPDU from an access point (AP) through the entire bandwidth and to determine whether only a first inverse fourier transform (IFFT) is applied to the PPDU or whether a first IFFT and a second IFFT are applied to the PPDU. In case only the first IFFT is applied to the PPDU, the processor 1060 may perform inverse transform on the PPDU by using the first FFT, and, then, the processor 1060 may decode the PPDU by using the first pilot tone, which is allocated based on the first pilot tone allocation. In the viewpoint of the frame, the processor 1060 may be configured to decode a first frame being generated by using the conventional first pilot tone pattern based only on the first IFFT or to decode a second frame being generated by using the second pilot tone pattern based on the second IFFT.

In case the first IFFT and the second IFFT are applied to the PPDU, the processor 1060 may perform inverse transform on the PPDU by using the first FFT and the second FFT. Additionally, the processor 1060 may perform decoding on a field applying the first IFFT, among the fields included in the PPDU, by using a first pilot tone that is allocated based on the first pilot allocation, and the processor 1060 may perform decoding on a field applying the second IFFT, among the fields included in the PPDU, by using a second pilot tone that is allocated based on the second pilot allocation.

The size of the second IFFT may correspond to n times (wherein n is an integer equal to 2 or more) the size of the first IFFT.

The processor 1010 and 1060 may include an application-specific integrated circuit (ASIC), another chip set, a logical circuit, a data processing device, and/or a converter converting a baseband signal and a radio signal to and from one another. The memory 1020 and 1070 may include a read-only memory (ROM), a random access memory (RAM), a flash memory, a memory card, a storage medium, and/or another storage device. The RF unit 1030 and 1080 may include one or more antennas transmitting and/or receiving radio signals.

When the exemplary embodiment is implemented as software, the above-described method may be implemented as a module (process, function, and so on) performing the above-described functions. The module may be stored in the memory 1020 and 1070 and may be executed by the processor 1010 and 1060. The memory 1020 and 1070 may be located inside or outside of the processor 1010 and 1060 and may be connected to the processor 1010 and 1060 through a diversity of well-known means.

What is claimed is:
1. A method for transmitting data based on different pilot tone patterns in a wireless LAN, comprising:
   transmitting, by an access point (AP), a first data field being generated based on a first pilot tone pattern within a first frequency bandwidth to a first station (STA); and
   transmitting, by the AP, a second data field being generated based on a second pilot tone pattern within a second frequency bandwidth to a second STA, wherein a size of the first frequency bandwidth is n times (wherein n is an integer equal to or greater than 2) larger than a size of the second frequency bandwidth, wherein an inverse fast fourier transform (IFFT) size being applied to the first data field is equal to an IFFT size being applied to the second data field, wherein the first pilot tone pattern includes a plurality of first pilot tones, wherein each of the plurality of first pilot tones is allocated to each of a plurality of first pilot tone indexes, wherein the second pilot tone pattern includes a plurality of second pilot tones, wherein each of the plurality of second pilot tones is allocated to each of a plurality of second pilot tone indexes, wherein a part of the plurality of first pilot tone indexes is identical to the plurality of second pilot tone indexes, and wherein a pilot tone index has a positive value that increases in a direction along which the frequency increases based on a direct current (DC) tone and is mapped to each of a plurality of tones, and a pilot tone index has a negative value that decreases in a direction along which the frequency decreases based on the DC tone and is mapped to each of a plurality of tones.

2. The method of claim 1, wherein a plurality of the second pilot tone indexes are identical to odd-number indexed pilot tone indexes of odd-numbered pilot tones being located at odd-number indexed positions based on a DC tone, among the plurality of first pilot tones, or a plurality of the second pilot tone indexes are identical to even-number indexed pilot tone indexes of even-numbered pilot tones being located at even-number indexed positions based on the DC tone, among the plurality of first pilot tones.

3. The method of claim 2, wherein, in case a size of the first frequency bandwidth is equal to 80 MHz, the plurality of first pilot tone indexes correspond to $\{\pm 11, \pm 39, \pm 75, \pm 103\}$, wherein, in case a size of the second frequency bandwidth is equal to 20 MHz, and in case the plurality of second pilot tone indexes are identical to the odd-number indexed pilot tone indexes among the plurality of first pilot tones, the pilot tone indexes of the second pilot tones correspond to $\{\pm 11, \pm 75\}$, and wherein, in case the size of the second frequency bandwidth is equal to 20 MHz, and in case the plurality of second pilot tone indexes are identical to the even-number indexed pilot tone indexes among the plurality of first pilot tones, the pilot tone indexes of the second pilot tones correspond to $\{\pm 39, \pm 103\}$.

4. The method of claim 2, wherein, in case the size of the first frequency bandwidth is equal to 160 MHz, the plurality of first pilot tone indexes correspond to $\{\pm 25, \pm 53, \pm 89, \pm 117, \pm 139, \pm 167, \pm 203, \pm 231\}$, wherein, in case the size of the second frequency bandwidth is equal to 40 MHz, and in case the plurality of second pilot tone indexes are identical to the odd-number indexed pilot tone indexes among the plurality of first pilot tones, the pilot tone indexes of the second pilot tones correspond to $\{\pm 25, \pm 89, \pm 139, \pm 203\}$, and wherein, in case the size of the second frequency bandwidth is equal to 20 MHz, and in case the plurality of second pilot tone indexes are identical to the even-number indexed pilot tone indexes among the plurality of first pilot tones, the pilot tone indexes of the second pilot tones correspond to $\{\pm 53, \pm 117, \pm 167, \pm 231\}$.

5. An access point (AP) for transmitting data based on different pilot tone patterns in a wireless LAN, comprising:
a radio frequency (RF) unit transmitting and receiving radio signals; and
a processor being operatively connected to the RF unit, wherein the processor is configured:
to transmit a first data field being generated based on a first pilot tone pattern within a first frequency bandwidth to a first station (STA), and
to transmit a second data field being generated based on a second pilot tone pattern within a second frequency bandwidth to a second STA, wherein a size of the first frequency bandwidth is n times (wherein n is an integer equal to or greater than 2) larger than a size of the second frequency bandwidth, wherein an inverse fast fourier transform (IFFT) size being applied to the first data field is equal to an IFFT size being applied to the second data field, wherein the first pilot tone pattern includes a plurality of first pilot tones, wherein each of the plurality of first pilot tones is allocated to each of a plurality of first pilot tone indexes, wherein the second pilot tone pattern includes a plurality of second pilot tones, wherein each of the plurality of second pilot tones is allocated to each of a plurality of second pilot tone indexes, wherein a part of the plurality of first pilot tone indexes is identical to the plurality of second pilot tone indexes, and wherein a pilot tone index has a positive value that increases in a direction along which the frequency increases based on a direct current (DC) tone and is mapped to each of a plurality of tones, and a pilot tone index has a negative value that decreases in a direction along which the frequency decreases based on the DC tone and is mapped to each of a plurality of tones.

6. The AP of claim 5, wherein a plurality of the second pilot tone indexes are identical to odd-number indexed pilot tone indexes of odd-numbered pilot tones being located at odd-number indexed positions based on a DC tone, among the plurality of first pilot tones, or a plurality of the second pilot tone indexes are identical to even-number indexed pilot tone indexes of even-numbered pilot tones being located at even-number indexed positions based on the DC tone, among the plurality of first pilot tones.

7. The AP of claim 6, wherein, in case a size of the first frequency bandwidth is equal to 80 MHz, the plurality of first pilot tone indexes correspond to $\{\pm 11, \pm 39, \pm 75, \pm 103\}$, wherein, in case a size of the second frequency bandwidth is equal to 20 MHz, and in case the plurality of second pilot tone indexes are identical to the odd-number indexed pilot tone indexes among the plurality of first pilot tones, the pilot tone indexes of the second pilot tones correspond to $\{\pm 11, \pm 75\}$, and wherein, in case the size of the second frequency bandwidth is equal to 20 MHz, and in case the plurality of second pilot tone indexes are identical to the even-number indexed pilot tone indexes among the plurality of first pilot tones, the pilot tone indexes of the second pilot tones correspond to $\{\pm 39, \pm 103\}$.

8. The AP of claim 6, wherein, in case the size of the first frequency bandwidth is equal to 160 MHz, the plurality of first pilot tone indexes correspond to $\{\pm 25, \pm 53, \pm 89, \pm 117, \pm 139, \pm 167, \pm 203, \pm 231\}$, wherein, in case the size of the second frequency bandwidth is equal to 40 MHz, and in case the plurality of second pilot tone indexes are identical to the odd-number indexed pilot tone indexes among the plurality of first pilot tones, the pilot tone indexes of the second pilot tones correspond to $\{\pm 25, \pm 89, \pm 139, \pm 203\}$, and wherein, in case the size of the second frequency bandwidth is equal to 20 MHz, and in case the plurality of second pilot tone indexes are identical to the even-number indexed pilot tone indexes among the plurality of first pilot tones, the pilot tone indexes of the second pilot tones correspond to $\{\pm 53, \pm 117, \pm 167, \pm 231\}$.

* * * * *